United States Patent
Wang et al.

(10) Patent No.: US 10,484,898 B2
(45) Date of Patent: Nov. 19, 2019

(54) SYSTEM AND APPARATUS FOR MEASUREMENT REPORT IN COORDINATED MULTIPOINT TRANSMISSION SYSTEM

(75) Inventors: Xiaoyi Wang, Hoffman Estates, IL (US); Chunli Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 205 days.

(21) Appl. No.: 14/418,527

(22) PCT Filed: Aug. 2, 2012

(86) PCT No.: PCT/CN2012/079559
§ 371 (c)(1),
(2), (4) Date: Jan. 30, 2015

(87) PCT Pub. No.: WO2014/019187
PCT Pub. Date: Feb. 6, 2014

(65) Prior Publication Data
US 2015/0189527 A1    Jul. 2, 2015

(51) Int. Cl.
*H04W 24/10* (2009.01)
*H04B 7/024* (2017.01)
*H04W 24/08* (2009.01)
*H04L 1/00* (2006.01)
*H04L 12/26* (2006.01)
*H04L 5/00* (2006.01)
*H04L 25/02* (2006.01)
(Continued)

(52) U.S. Cl.
CPC ........... *H04W 24/08* (2013.01); *H04L 1/0026* (2013.01); *H04L 5/006* (2013.01); *H04L 43/16* (2013.01); *H04L 5/001* (2013.01); *H04L 5/0057* (2013.01); *H04L 25/0224* (2013.01); *H04W 24/10* (2013.01); *H04W 28/18* (2013.01); *H04W 72/00* (2013.01)

(58) Field of Classification Search
None
See application file for complete search history.

(56) References Cited

U.S. PATENT DOCUMENTS

| | | | |
|---|---|---|---|
| 2010/0232382 A1* | 9/2010 | Gauvreau | H04W 72/02 370/329 |
| 2010/0238821 A1 | 9/2010 | Liu et al. | 370/252 |

(Continued)

FOREIGN PATENT DOCUMENTS

| | | |
|---|---|---|
| CN | 102457349 A | 5/2012 |
| EP | 1 816 772 A1 | 8/2007 |

(Continued)

OTHER PUBLICATIONS

12882027.1-1851, European search report, dated Feb. 24, 2016.
12882027.1-1851, office action, Communication pursuant to Rules 70(2) and 70a(2) EPC, dated Mar. 11, 2016.

*Primary Examiner* — Ayanah S George
(74) *Attorney, Agent, or Firm* — Harrington & Smith (57) ABSTRACT

A method includes comparing at least one received signal received parameter value for at least one channel state information reference signal associated with a first frequency with at least one received signal received parameter value for at least one channel state information reference signal associated with a second frequency; and causing information from said comparing to be reported.

18 Claims, 4 Drawing Sheets

(51) Int. Cl.
  *H04W 28/18*  (2009.01)
  *H04W 72/00*  (2009.01)

(56) References Cited

U.S. PATENT DOCUMENTS

| | | | | |
|---|---|---|---|---|
| 2011/0170496 A1* | 7/2011 | Fong | ............... | H04L 5/0053 |
| | | | | 370/329 |
| 2011/0199986 A1 | 8/2011 | Fong et al. | ............... | 370/329 |
| 2011/0312328 A1* | 12/2011 | Choi | ............... | H04L 5/0062 |
| | | | | 455/450 |
| 2013/0003788 A1* | 1/2013 | Marinier | ............ | H04B 7/024 |
| | | | | 375/219 |

FOREIGN PATENT DOCUMENTS

| | | | | |
|---|---|---|---|---|
| EP | 2 445 253 A1 | 4/2012 | | |
| EP | 2445253 A1 * | 4/2012 | ............ | H04B 7/024 |
| EP | 2552148 A2 | 1/2013 | | |
| KR | 20110106215 A | 9/2011 | | |
| WO | WO 2011/085191 A1 | 7/2011 | | |

* cited by examiner

SYSTEM AND APPARATUS FOR MEASUREMENT REPORT IN COORDINATED MULTIPOINT TRANSMISSION SYSTEM

This disclosure relates to a method and apparatus and in particular but not exclusively to a method and apparatus usable in a context of a coordinated multipoint transmission arrangement.

A communication system can be seen as a facility that enables communication sessions between two or more entities such as fixed or mobile communication devices, base stations, servers, machine type communication devices and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication such as access to the communication system and feedback messaging shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas provided by a station. Radio service areas can overlap, and thus a communication device in an area can send signals to and receive signals from more than one station. A more detailed example of wireless systems is an architecture standardized by the 3rd Generation Partnership Project (3GPP) and referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can be accessed by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment.

More advanced transmission schemes can become increasingly desirable with the technical evolution. For example, it has been proposed that a node may communicate simultaneously on a plurality of carriers. Multipoint schemes such as Coordinated Multi-Point Transmission (CoMP) have been proposed to provide this. Coordinated multipoint transmission (CoMP) is a technique where combined results of reception by a plurality of stations from a communication device or reception of a transmission based on signals transmitted from a plurality of sources can be utilised. CoMP can be provided for example in heterogeneous network scenarios. In such arrangement a centralised processing unit controlling the relevant cells is also provided.

Carrier aggregation has been proposed where a plurality of carriers are aggregated to increase bandwidth. Carrier aggregation comprises aggregating a plurality of component carriers into a carrier that is referred to as an aggregated carrier.

CoMP and carrier aggregation may be deployed at the same time and effectively use different management schemes.

According to an aspect, there is provided a method comprising: comparing at least one received signal received parameter value for at least one channel state information reference signal associated with a first frequency with at least one received signal received parameter value for at least one channel state information reference signal associated with a second frequency; and causing information from said comparing to be reported.

The received signal received parameter may comprise at least one of received signal received power and received signal received quality.

The method may comprise receiving channel state information reference signals from a plurality of different transmission points.

The method may comprise measuring the received signal received parameter values for said received signals.

The information may be used for coordinated multipoint transmission.

The method may comprise receiving at least one of said channel state information reference signals on an aggregated carrier.

The causing of information to be reported may be triggered by said comparing.

A best received signal received parameter value for said at least one channel state information reference signal associated with the first frequency may be compared with a best received signal received parameter value for said at least one channel state information reference signal associated with the second frequency.

The best received signal received parameter value for the at least one channel state information reference signal associated with the second frequency may comprise the best received signal received parameter value for a resource corresponding to a primary cell frequency.

The method may comprise comparing the nth strongest received signal received parameter value for the at least one channel state information reference signal associated with the first frequency with the nth strongest received signal received parameter value for the at least one channel state information reference signal associated with the second frequency.

The second frequency may comprise a reference frequency or a serving frequency.

The reporting may comprise reporting one of N strongest received signal received parameter values for said first and second frequencies, reporting all of the received signal received parameter values and reporting received signal received parameter values which have a defined offset worse than a best received signal received parameter value.

The methods as described previously may be carried out in an apparatus. The apparatus may be provided in a user device or user equipment.

According to another aspect, there is provided an apparatus comprising at least one processor and at least one memory including computer code for one or more programs, the at least one memory and the computer code configured, with the at least one processor, to cause the apparatus at least to: compare at least one received signal received parameter value for at least one channel state information reference signal associated with a first frequency with at least one received signal received parameter value for at least one channel state information reference signal associated with a second frequency; and cause information from said comparing to be reported.

The at least one memory and the computer code may be configured with the at least one processor to cause the apparatus to receive channel state information reference signals from a plurality of different transmission points.

The at least one memory and the computer code may be configured with the at least one processor to cause the apparatus to measure the received signal received parameter values for said received signals.

The information may be used for coordinated multipoint transmission.

The at least one memory and the computer code may be configured with the at least one processor to cause the apparatus to receive at least one of said channel state information reference signals on an aggregated carrier.

The at least one memory and the computer code may be configured with the at least one processor to cause the apparatus to cause the reporting of said information to be triggered by said comparing.

The at least one memory and the computer code may be configured with the at least one processor to cause the apparatus to compare a best received signal received parameter value for said at least one channel state information reference signal associated with the first frequency with a best received signal received parameter value for said at least one channel state information reference signal associated with the second frequency.

The best received signal received parameter value for the at least one channel state information reference signal associated with the second frequency may comprise the best received signal received parameter value for a resource corresponding to a primary cell frequency.

The at least one memory and the computer code may be configured with the at least one processor to cause the apparatus to compare the nth strongest received signal received parameter value for the at least one channel state information reference signal associated with the first frequency with the nth strongest received signal received parameter value for the at least one channel state information reference signal associated with the second frequency.

The second frequency may comprise a reference frequency or a serving frequency.

The at least one memory and the computer code may be configured with the at least one processor to cause the apparatus to report one of N strongest received signal received parameter values for said first and second frequencies, reporting all of the received signal received parameter values and reporting received signal received parameter values which have a defined offset worse than a best received signal received parameter value.

The received signal received parameter may comprise at least one of received signal received power and received signal received quality.

According to another aspect, there is provided an apparatus comprising: means for comparing at least one received signal received parameter value for at least one channel state information reference signal associated with a first frequency with at least one received signal received parameter value for at least one channel state information reference signal associated with a second frequency; and means for causing information from said comparing means to be reported.

The received signal received parameter may comprise at least one of received signal received power and received signal received quality.

The apparatus may comprise means for receiving channel state information reference signals from a plurality of different transmission points.

The apparatus may comprise means for measuring the received signal received parameter for said received signals.

The information may be used for coordinated multipoint transmission.

The apparatus may comprise means for receiving at least one of said channel state information reference signals on an aggregated carrier.

The means for reporting may be triggered by a comparing being carried out by said comparing means.

The comparing means may compare a best received signal received parameter value for said at least one channel state information reference signal associated with the first frequency with a best received signal received parameter value for said at least one channel state information reference signal associated with the second frequency.

The received signal received parameter value for the at least one channel state information reference signal associated with the second frequency may comprise the best received signal received parameter value for a resource corresponding to a primary cell frequency.

The comparing means may be for comparing the nth strongest received signal received parameter value for the at least one channel state information reference signal associated with the first frequency with the nth strongest received signal received parameter value for the at least one channel state information reference signal associated with the second frequency.

The second frequency may comprise a reference frequency or a serving frequency.

The reporting means may be for reporting one of N strongest received signal received parameter values for said first and second frequencies, reporting all of the received signal received parameter values and reporting received signal received parameter values which have a defined offset worse than a best received signal received parameter value.

The apparatuses may be provided and the methods implemented in a user equipment for a communication system.

A computer program comprising program code means adapted to perform the methods may also be provided.

Various other aspects and further embodiments are also described in the following detailed description and in the attached claims.

Different aspects from may be combined in part or in full.

Embodiments will now be described in further detail, by way of example only, with reference to the following examples and accompanying drawings, in which.

Certain exemplifying embodiments are explained below with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

Figure 1:
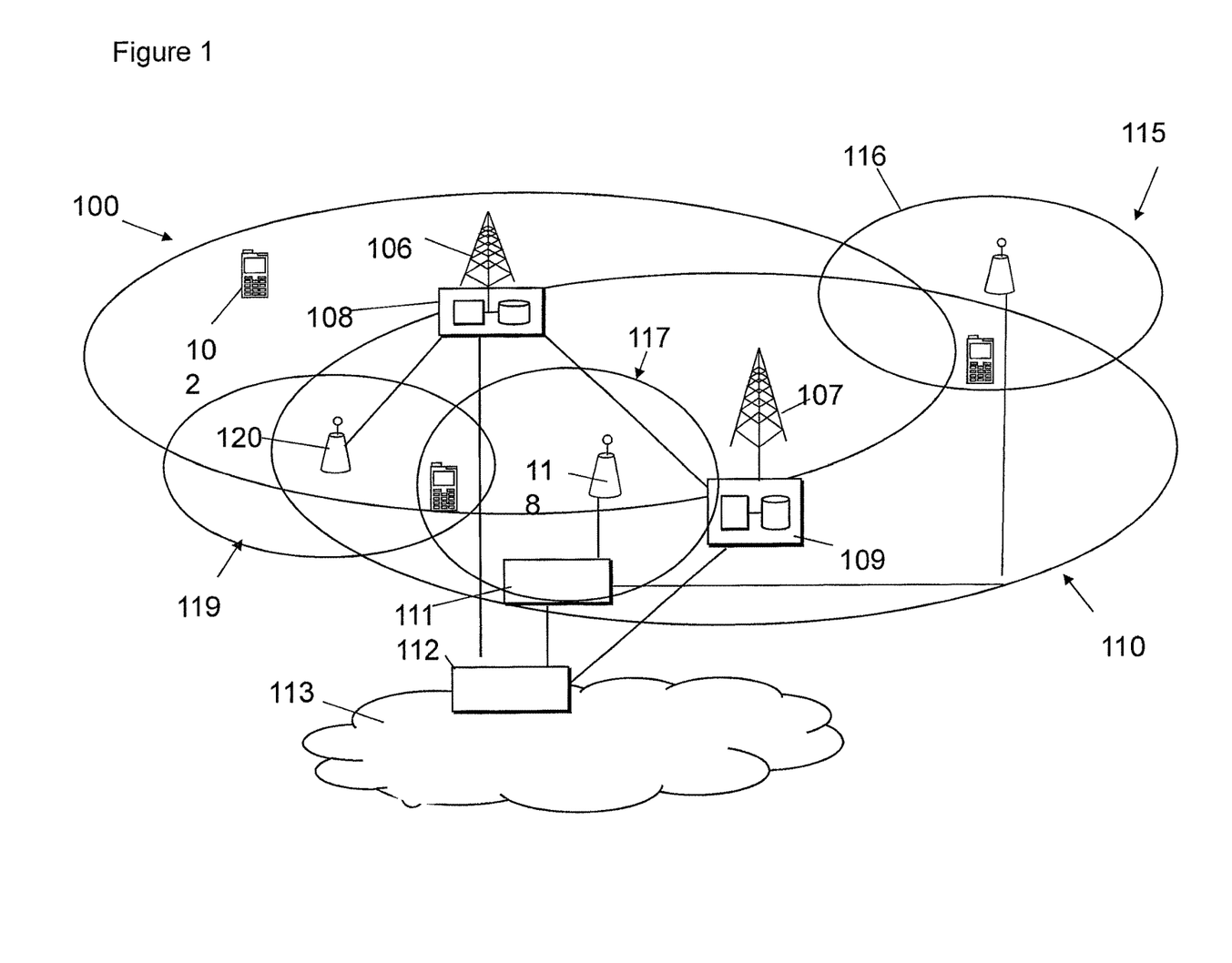
FIG. 1 show a schematic diagram of a system where some embodiments are applicable.

In a wireless communication system mobile communication devices or user equipment (UE) 102 are provided wireless access via at least one base station or similar wireless transmitting and/or receiving node or point. The example of FIG. 1 shows overlapping access systems or radio service areas 100 and 110 of a cellular system and smaller radio service areas 117 and 119 provided by base stations 106, 107, 118 and 120. For example, in the LTE the transmission/reception points can comprise wide area network nodes such as macro eNode B (eNB) which may, for example, provide coverage for an entire cell or similar radio service area. Network nodes can also be small or local radio service area network nodes, for example Home eNBs (HeNB), pica eNodeBs (pico-eNB), or femto nodes. Some applications may utilise radio remote heads (RRH) that are connected to, for example, an eNB. The smaller radio service areas can be located wholly or partially within the larger radio service area. The nodes of the smaller radio service areas may be configured to support local offload. The local nodes can also, for example, be configured to extend the range of a cell. A mobile communication device may thus be located within, and thus communicate with, more than one radio station and the communication devices and stations may have one or more radio channels open at the same time and may send signals to and/or receive signals from more than one source.

It is noted that the number of radio service areas and their borders are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. It is noted that more than one macro level base station may be controlled e.g. by control apparatus 108. The control apparatus of a base station can be interconnected with other control entities. The control apparatus is typically provided with memory capacity and at least one data processor. The control apparatus and functions may be distributed between a plurality of control units.

In FIG. 1 stations 106 and 107 are shown being connected to a wider communications network 113 via gateway 112. A further gateway function may be provided to connect to another network. The smaller area stations 118 and 120 can also be connected to the network 113, for example by a separate gateway function and/or via the controllers of the macro level stations. In the example, station 118 is connected via a gateway 111 whilst station 120 can provide a remote radio head that connects via the controller apparatus 108.

Figure 2:
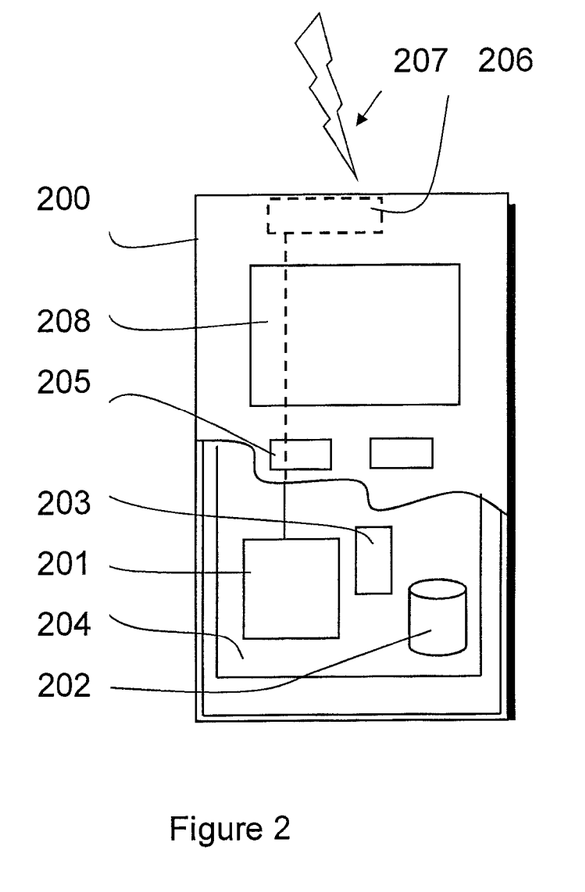
FIG. 2 shows a schematic diagram of a mobile communication device according to some embodiments.

FIG. 2 is a schematic, partially sectioned view of a possible mobile communication device 200 for communication with the stations. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Non-limiting examples of the content include various downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device. A wireless communication device can be provided with a Multiple Input/Multiple Output (MIMO) antenna system.

A mobile device is also typically provided with at least one data processing entity 201, at least one memory 202 and other possible components 203 for use in software and hardware aided execution of tasks it is designed to perform, including control of access to and communications, such as communication of data and control signals with access systems and other communication devices. The apparatus can be adapted to provide measurement to detect and/or select radio points, determination of appropriate radio points and reporting thereof of the embodiments described in more detail below. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
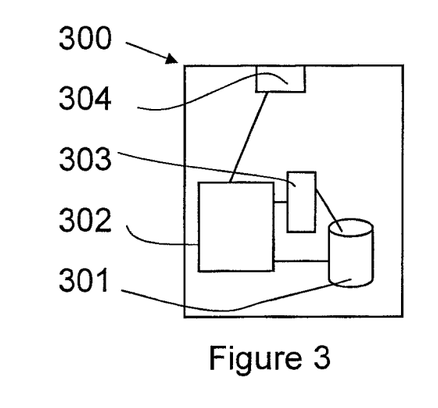
FIG. 3 shows a schematic diagram of a control apparatus according to some embodiments.

FIG. 3 shows an example of a control apparatus for a communication system, for example to be coupled to and/or for controlling one or more stations of an access system. In some embodiments base stations comprise a separate control apparatus. In other embodiments the control apparatus can be another network element. The control apparatus 300 can be arranged to provide control on communications in a service area of the system. The control apparatus can be configured to provide control functions in association with generation and communication of instructions to relevant communication devices and processing of responses from the devices and other related information by means of the data processing facility in accordance with certain embodiments described below. For this purpose the control apparatus 300 comprises at least one memory 301, at least one data processing unit 302, 303 and an input/output interface 304. Via the interface the control apparatus can be coupled to a receiver and a transmitter of a base station. The control apparatus can be configured to execute an appropriate software code to provide the control functions. It shall be appreciated that similar component can be provided in a control apparatus provided elsewhere in the system for controlling reception of sufficient information for decoding of received information blocks.

A non-limiting example of the recent developments in communication system architectures is the long-term evolution (LTE) of the Universal Mobile Telecommunications System (UMTS) that is being standardized by the 3rd Generation Partnership Project (3GPP). Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base station nodes of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

A possible CoMP scenario is where one cell manages a plurality of geometrically separated transmission/reception (Tx/Rx) points. This scenario is often referred to a CoMP scenario 4. In this scenario intra-cell channel state information (CSI) measurement and feedback is provided. One cell manages two or more geometrically separated Tx/Rx points. As a consequence, the intra-cell CSI measurement and feedback is needed for the eNB to choose the transmission points TP for CoMP operation CoMP in accordance with scenarios 1/2/3 requires an inter-cell CSI part. Channel state information reference signal (CSI-RS) resource can be configured in a cell-agnostic manner to support the CSI feedback for intra-cell and inter-cell cases. In some embodiments, one CSI-RS resource is for one transmission (Tx) point but one user equipment (UE) can be configured for a plurality of CSI-RS resources.

The CSI-RS symbols are used for channel state information functions such as channel quality information, PMI (precoding matrix index) and RI (rank indicator) measurement and reporting. CSI-RS may be transmitted periodically. In some embodiments, the periodicity of the CSI-RS may be configurable with duty cycle values for example ranging between 5 ms to 80 ms. The CSI-RS are received by a user equipment. The user equipment will estimate the channel state information based on the CSI-RS and transmit feedback to the transmission point (for example a base station). The base station can use the CSI feedback in the selection of parameters such as the pre-coder and modulation and coding scheme for the data.

It has been proposed to have a unified solution for both inter and intra cell scenarios. In for example release 11 of LTE, CSI-RS based RSRP (reference signal received power) is supported for both intra and inter cell CoMP set management. The CSI-RS resource is defined as a set of CSI-RS RE (resource elements) configured by high layer signalling. In other words, it is irrelevant as to the associated physical cell. A user equipment may be configured with multiple CSI-RS resources as a CoMP resource management set to perform RSRP measurement and a CoMP resource management set to perform RSRP measurement and a CoMP measurement set for which the user equipment is performing CSI measurement and reporting for CoMP operation.

However, release 11 CoMP assumes intra frequency cooperation. This proposal does not consider inter frequency events for CSI-RS RSRP. This means that inter frequency RSRP reports are provided only by legacy CRS-based RRM measurements.

If CoMP and carrier aggregation are deployed simultaneously, two levels of resource management schemes are applied. The first level relies on CRS based RSRP reports to decide which component carrier (CC) the user equipment should aggregate with. Secondly, reliance is placed on CSI-RS RSRP reports to decide which transmission point (TP) should be considered as the measurement set within each component carrier. These two levels of resource management may not be optimal in some scenarios. Further, both the selection of component carriers and the CoMP set do not change the primary serving cell. The primary serving cell is changed as a result of handover. Thus, the selection of component carriers and the CoMP set are different from radio resource management (RRM). Thus, a generic resource management framework which is different from the radio resource management is provided in some embodiments to deal with the carrier aggregation and CoMP cases.

In release 11, a NCT (new carrier type) has been proposed although this has been postponed to release 12. This new carrier type has the CRS for example every 5 ms instead of every subframe. User implementation and requirements may be updated to fit with this scenario.

In some embodiments, the CSI-RS based RSRP measurements may be extended to cover the carrier aggregation case.

In LTE releases 8 to 10, CRS-based RSRP/RSRQ (reference signal received quality) measurement was defined with different event triggers. These event triggers may be for example when the serving cell becomes better and/or worse than a threshold, when the neighbouring cell becomes better than a threshold, when the neighbouring cell becomes an offset better than the serving cell and/or the like. Those events cover both intra frequency and inter frequency triggering. However, in some scenarios, these events may not be suitable for CSI-RS based measurements or CoMP based management. For example, CoMP measurement set management may not be designed for handover. CoMP measurement set management is designed to select several cells with similar received signal quality instead of only selecting the strongest cell. CoMP resource management set and measurement set may include multiple cells and/or transmission points on the same or different frequencies. This means a plurality of serving cells and/or transmission points for event triggering. The user equipment may not be able to derive the CoMP measurement set in terms of physical transmission points from the CSI measurement configuration so there may be no clear equivalent to the serving cell.

In some embodiments, an event trigger and/or report is provided which supports both intra frequency and inter frequency for CSI-RS based RSRP/RSRQ measurement.

In some embodiments CSI-RS RSRP measurement objects are each associated with a particular frequency or frequency range. The measurement object or objects associated with the CSI-RS resources configured for CSI measurement and report is/are defined as the serving object or objects, that is the frequency on which the CoMP operation is performed. Each object includes a plurality of CSI-RS resources as the CoMP resource management set. An intra frequency RSRP event is applied for CSI-RS resources inside the object.

An inter frequency event is defined to compare the RSRP of CSI-RS resources between any object and predefined object or objects, e.g. the serving object or objects. The inter frequency event can be any suitable inter frequency event. In some embodiments, more than one inter frequency event is used.

By way of example, the inter-frequency event may comprise one or more of the following:

compare the best RSRP value measured amongst all CSI-RS resources within one frequency range or measurement object with the best RSRP measured among all CSI-RS resources within a predefined frequency, e.g. the serving frequency associated with the serving object or a frequency explicitly indicated from the eNB as the reference. If there are more than one serving frequencies, the strongest RSRP measured from all CSI-RS resources among all the frequencies may be used. Alternatively, the strongest RSRP measured from all CSI-RS resources in the object corresponding to the primary cell frequency may be considered; and/or a second inter frequency event may require the comparison of the Nth strongest RSRP values measured among all CSI-RS resources in one frequency (one measurement object) with the Nth strongest RSRP measured among all CSI-RS resources within a predefined frequency e.g. the serving frequency or a frequency explicitly indicated from the eNB as the reference. The serving frequency may be associated with the primary cell and/or maybe across all serving objects.

In some embodiments, hysteresis can be used to trigger the event. This is to avoid a ping-pong effect.

Alternatively or additionally, an offset can be applied to compensate for the different propagation losses for different frequencies. The offset can be defined as X dB. X may be a radio resource control configurable parameter.

Figure 4:
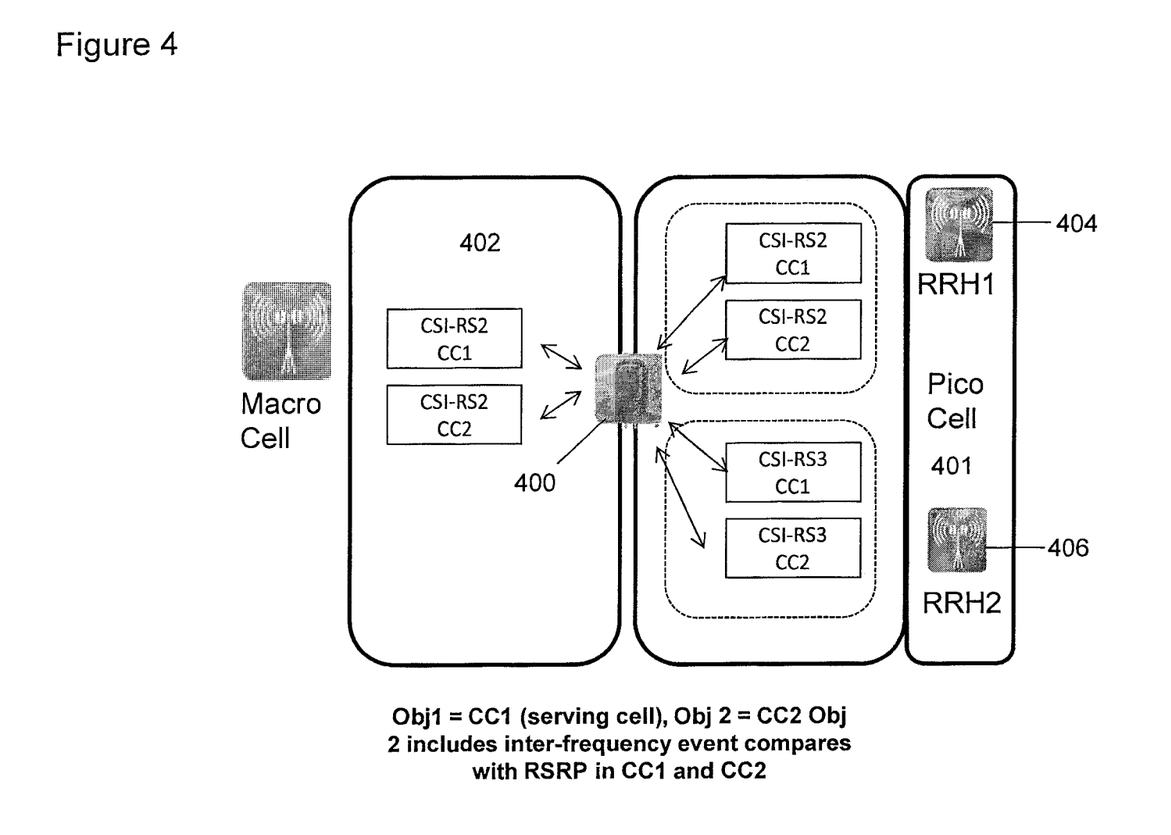
FIG. 4 shows a schematic illustration of an embodiment.

When the event is triggered, the user equipment may report the N strongest RSRP values for each frequency, for all the frequencies in total or only report the ones which fall into the window of the offset worse than the best transmission point. Reference is made to FIG. 4. A user equipment 400 is associated with a macro cell 402 and a pico cell 401 with a first remote radio head 404 and a second remote radio head 406. As shown in FIG. 4, for each component carrier, there are three CSI-RS resources, CSI-RS1, CSI-RS2 and CSI-RS3.

In the example shown in FIG. 4, there is a first component carrier CC1 and a second component carrier CC2. Each of the macro cell and RRHs provide a first component carrier CC1. Likewise, each of the macro cell and RRHs provide a second component carrier CC2. The component carriers are at different frequencies or frequency ranges. In the arrangement of FIG. 4, one measurement object covers one frequency and inter frequency events are defined between the objects. An intra frequency event is defined on the CSI-RS resources within one frequency. In other words, the intra frequency event is defined between, for example the 3 CC1 resources and/or the 3 CC2 resources. An inter frequency event is defined, for example, to compare the best RSRP of the first component carrier with the best RSRP of the second component carrier, and/or any of the alternatives discussed previously Reference is made to FIG. 5 which shows a method flow in some embodiments. In the first step S1, the CS1-RSRP measurement objects are defined. For example, in the context of an arrangement such as shown in FIG. 4, the first measurement object would have CSI-RS 1 for the first component carrier CC1 of the macro cell, the CSI-RS 2 of the first component carrier CC1 of the first RRH 404 and the CSI-RS 3 of the first component carrier CC1 of the second RRH 406.

Figure 5:
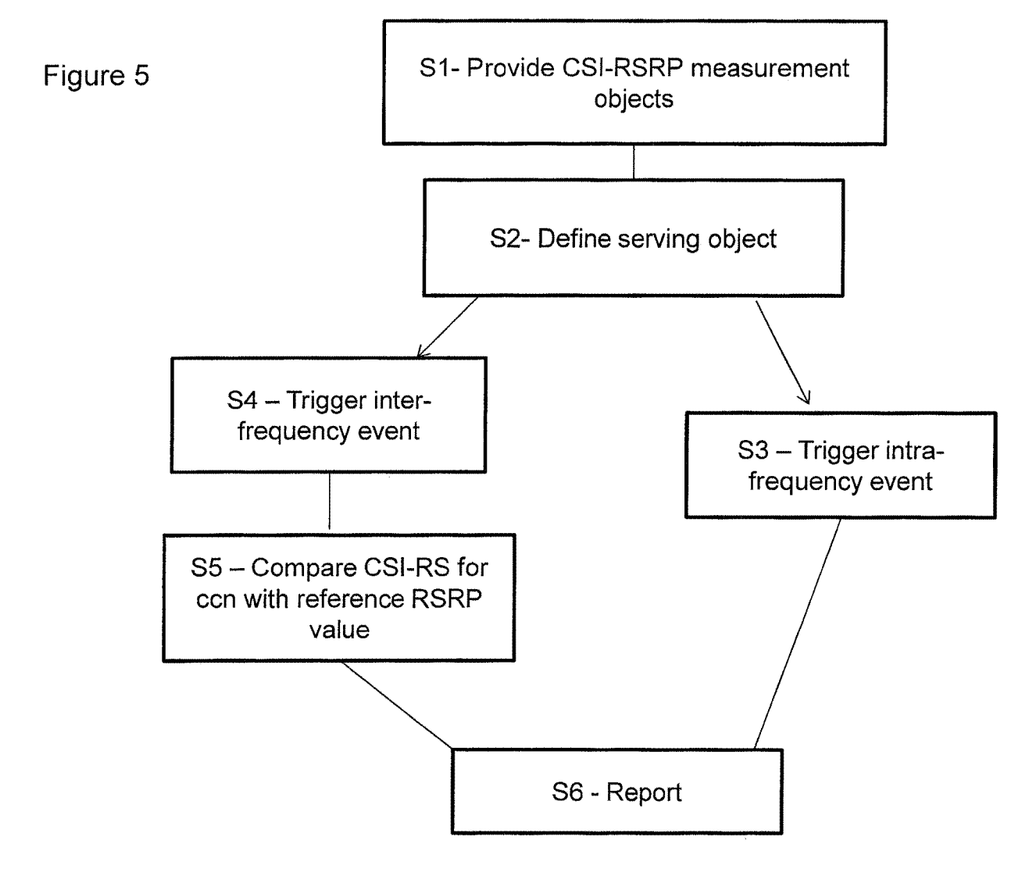
FIG. 5 shows a method flow.

In step S2, the serving/reference object is defined or identified. This will be identifying which of the component carriers CC1 or CC2 is considered to be the serving/reference frequency. In some embodiments, there may be more than one serving frequency. The flow in FIG. 5 is divided into two separate flows, one for intra frequency events and one for inter frequency events.

In step S3, a trigger to apply an intra frequency event inside the object is detected. This event can take any suitable form. When the event occurs, the CSI-RS 1, 2 and 3 for a given component carrier are compared. The inter-frequency comparison is to identify the RSRP strength from different RRH. The eNB configures the CSI-RS 1, 2 and 3 from different transmission points such as RRHs, eNode Bs and/or the like separately. Therefore the RSRP of CSI-RS 1 2 and 3 represent the reception power of each transmission point at the UE.

In step S4, the trigger to apply an inter-frequency event is determined. It should be appreciated that is the trigger for the intra frequency event and the inter frequency event may be the same or different.

In step S5, the RSRP value for a given component carrier is compared with a reference RSRP value for a different component carrier. Various different examples of which RSRP value for a particular component carrier is compared with which reference RSRP value are as previously outlined. This is to determine is one or more TPs on another frequency is better than the ones currently having CoMP operation.

In some embodiments, a report is sent in step S6 which is after steps S5 and S3. A single report or separate reports may be sent.

Thus, in some embodiments, CSI-RS resources may be configured on a plurality of different frequencies to perform RSRP measurements. In some embodiments, the frequency configured with the CSI-RS resource for CSI measurement and report may be considered the serving frequency. For example, if F1 is the serving frequency configured with the CSI-RS resources for RSRP measurement and CSI measurement and F2 may be the neighbouring frequency configured with only CSI-RS resources for RSRP measurement. Any suitable trigger may be used. For example, when the best RSRP of the CSI-RS resources of F2 become an offset bigger than the best RSRP of the CSI-RS resources in F1.

When the event is triggered, a given number of the best RSRP of F1 and F2 may be reported. For example, the best N CSI-RS index with the RSRP values or the ones that fall into the window less than X dB worse in the best one may be reported.

In some embodiments, a triggering can be implemented by defining a window as received signal quality within X dB (X dB designating a configurable threshold, e.g. 3 dB, 5 dB, 10 dB) worse than the quality of the best point/port. That is, from UE perspective, the UE derives the RSRP for one point from one port. The UE may measure a port or combination of multiple ports.

Alternatively or additionally, an initial report is triggered upon configuration of the CSI-RS based received signal quality measurement. The best N points/ports that fall into the window are reported. If a number M of points/ports that fall into the window is smaller than N, M points can be reported. The reported N or M points/ports can be considered as report set, wherein N is configurable e.g. by RRC signalling.

Alternatively or additionally an event trigger after the initial report is when the best N or M points/ports that fall into the window change, i.e. when the report set changes.

Alternatively or additionally, a "hysteresis" is applied to the points when comparing if the report set changes (this may not be applicable for the initial report upon configuration), e.g. the points from the outset of the report set should be better than the worst point/port in the set by some predefined/predetermined difference to be considered as replacing the point/port.

Alternatively or additionally instead of comparing between a previously and newly estimated report set, the UE can derive a serving points set from the configured CSI-RS feedback. Such serving point set can be used as reference for the comparison to newly obtained report set.

The report may include, when triggered, the index or/and received signal quality (e.g. RSRP/RSRQ) of the best M or N (M≤N) points/ports that fall into the window.

A base station such as an eNB may alternatively or additionally configure a periodical received signal quality report. In that case, the UE periodically reports the index of received signal quality of the best M or N points/ports that fall into the window.

Alternatively or additionally, configurable parameters are a threshold to define the window, the "hysteresis" to avoid a too frequent change of the report set, and/or N as a maximum number of best points/ports to be reported.

The embodiments discussed above may alternatively or be additionally used other than for CoMP or CA. For example, the RSRP report or similar gives the eNB information about the rough UE location. Therefore this information may be used for mobility support. Alternatively or additionally, some embodiments can be used in any scenario with a plurality of frequency layers.

In the above embodiments, the reference signal used is the CSI-RS. It should be appreciated that in other embodiments, different reference signals may be used. Embodiments may be used with different standards or different versions of the standards mentioned previously.

The method of FIG. 5 may be at least partially carried out a UE. For example at least some of the method may be carried out by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may be practiced in various components such as integrated circuit modules. The design of integrated circuits is by and large an automated process. Complex and powerful tools are available for converting a logic level design into a semiconductor circuit design ready to be formed on a semiconductor substrate.

It is noted that whilst embodiments have been described in relation to LTE, similar principles can be applied to any other communication system where dynamic feedback messaging may be desired. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. For example, a combination of one or more of any of the other embodiments previously discussed can be provided. All such and similar modifications of the teachings of this invention will still fall within the scope of this invention as defined in the appended claims.

What is claimed is:

1. A method comprising:
   comparing at least one best received signal received parameter value for at least one channel state information reference signal within a first frequency with at least one best received signal received parameter value for at least one channel state information reference signal within a second frequency,
   wherein the comparing comprises, comparing an $n^{th}$ strongest received signal received parameter value for the at least one channel state information reference signal within the first frequency with the $n^{th}$ strongest received signal received parameter value for the at least one channel state information reference signal within the second frequency, where n is an integer;
   determining that the comparing triggers a measurement report; and
   in response to the determining, reporting information from said comparing
   comprising the best received signal received parameter values of the at least one best received signal received parameter values for said first frequency and said second frequency to determine at least one of a component carrier and a transmission point for a coordinated multipoint transmission.

2. The method as claimed in claimed in claim 1, wherein said best received signal received parameter values comprises values of at least one of a received signal received power and received signal received quality.

3. The method as claimed in claim 1, wherein the channel state information reference signals within a respective at least one of said first frequency and said second frequency are received from different transmission points.

4. The method as claimed in claim 3, comprising measuring best received signal received parameter values for said received channel state information reference signals.

5. The method as claimed in claim 1, wherein at least one of said channel state information reference signals is received on an aggregated carrier.

6. The method as claimed in claim 1, wherein said best received signal received parameter values for the at least one channel state information reference signal within the second frequency comprises the best received signal received parameter values for a resource corresponding to a primary cell frequency.

7. The method as claimed in claim 1, wherein said second frequency comprises a reference frequency or a serving frequency.

8. The method as claimed in claim 1, wherein causing the information from said comparing to be reported comprises reporting one of N strongest received signal received parameter values for said first and second frequencies, reporting all of the received signal received parameter values and reporting received signal received parameter values which have a defined offset worse than a best received signal received parameter value, where N is an integer representing the number of the received signal received parameter values for each of the first and second frequencies.

9. A computer readable memory storing computer program code that, when executed by one or more processors, causes a user equipment to perform the method of claim 1.

10. An Apparatus comprising:
at least one processor, and
at least one memory including computer code for one or more programs, the at least one memory and the computer code configured, with the at least one processor, to cause the apparatus at least to:
compare at least one best received signal received parameter value for at least one channel state information reference signal within a first frequency with at least one best received signal received parameter value for at least one channel state information reference signal within a second frequency,
wherein the comparing comprises, comparing an $n^{th}$ strongest received signal received parameter value for the at least one channel state information reference signal within the first frequency with the $n^{th}$ strongest received signal received parameter value for the at least one channel state information reference signal within the second frequency, where n is an integer;
determine that the comparing triggers a measurement report; and
in response to the determining, cause reporting information from said comparing comprising the best received signal received parameter values for said first frequency and said second frequency to determine at least one of a component carrier and a transmission point for a coordinated multipoint transmission.

11. The Apparatus as claimed in claim 10, wherein the at least one memory and the computer code are configured with the at least one processor to cause the apparatus to receive the channel state information reference signals within a respective at least one of said first frequency and said second frequency are received from different transmission points.

12. The Apparatus as claimed in claim 11, wherein the at least one memory and the computer code are configured with the at least one processor to cause the apparatus to measure the received signal received parameter values for said received channel state information reference signals.

13. The Apparatus as claimed in claim 10, wherein the at least one memory and the computer code are configured with the at least one processor to cause the apparatus to receive at least one of said channel state information reference signals on an aggregated carrier.

14. The Apparatus as claimed in claim 10, wherein said best received signal received parameter value for the at least one channel state information reference signal within the second frequency comprises the best received signal received parameter value for a resource corresponding to a primary cell frequency.

15. The Apparatus as claimed in claim 10, wherein said second frequency comprises a reference frequency or a serving frequency.

16. The Apparatus as claimed in claim 10, wherein the at least one memory and the computer code are configured with the at least one processor to cause the apparatus to report one of N strongest received signal received parameter values for said first and second frequencies, reporting all of the received signal received parameter values and reporting received signal received parameter values which have a defined offset worse than a best received signal received parameter value, where N is an integer representing the number of the received signal received parameter values for each of the first and second frequencies.

17. The Apparatus as claimed in claim 10, wherein said received signal received parameter comprises at least one of received signal received power and received signal received quality.

18. A user equipment comprising the apparatus as claimed in claim 12.

* * * * *

UNITED STATES PATENT AND TRADEMARK OFFICE
CERTIFICATE OF CORRECTION

PATENT NO. : 10,484,898 B2
APPLICATION NO. : 14/418527
DATED : November 19, 2019
INVENTOR(S) : Xiaoyi Wang and Chunli Wu Page 1 of 1

It is certified that error appears in the above-identified patent and that said Letters Patent is hereby corrected as shown below:

In the Claims

In Claim 1:
Column 12, Line 54, "the best" should be deleted and --best-- should be inserted.

In Claim 10:
Column 14, Line 1, "cause" should be deleted.

Signed and Sealed this
Seventh Day of January, 2020

Andrei Iancu
*Director of the United States Patent and Trademark Office*